United States Patent [19]

Barnes et al.

[11] 4,289,996

[45] Sep. 15, 1981

[54] ACTUATORS

[75] Inventors: Robin R. Barnes, Twickenham; Ronald F. Delves, Guildford; James F. Slasor, Ockham, Near Woking, all of England

[73] Assignee: Frazer Nash Limited, Surrey, England

[21] Appl. No.: 937,820

[22] Filed: Aug. 29, 1978

[51] Int. Cl.³ .............................................. H02P 1/54
[52] U.S. Cl. ........................................ 318/38; 318/54; 318/8; 318/9
[58] Field of Search ....................... 74/625; 318/53, 38, 318/54, 55, 663, 666, 560, 625, 652, 8, 9; 310/156, 112, 114

[56] References Cited

U.S. PATENT DOCUMENTS

| | | | |
|---|---|---|---|
| 2,578,015 | 12/1951 | Reinhard | 318/8 |
| 2,617,864 | 11/1952 | Johnson | 318/663 X |
| 3,296,521 | 1/1967 | Wildberger | 318/663 X |
| 3,427,519 | 2/1969 | Louis | 318/625 X |
| 3,564,380 | 2/1971 | Zeldman | 318/663 |
| 4,139,790 | 2/1979 | Steen | 310/156 |

Primary Examiner—Ulysses Weldon
Attorney, Agent, or Firm—Howard L. Rose

[57] ABSTRACT

A powered linear actuator is provided primarily for releasing stores from aircraft, having dual closed loop servo motor systems driving a screw jack. The dual motors, which have samarium cobalt permanent magnets, drive the screw jack through differential gearing and each has an armature lock which functions automatically if a motor circuit fails thereby enabling the other motor to continue driving the actuator alone. Potentiometer feedback is applied to dual error amplifiers or polarized relays that compare the feedback position signal with the input command signal and drive separate motor energization channels. A replaceable plug-in resistor is provided in series with the potentiometer track so that the actuator stroke can readily be changed by changing one value plug-in resistor for another.

9 Claims, 9 Drawing Figures

ACTUATORS

This invention relates to powered actuators and is particularly, but not exclusively, concerned with actuators for releasing stores from aircraft.

The requirements regarding actuators for releasing aircraft stores are arduous. The actuator must be rugged and capable of operating in widely varying environments. It must possess high reliablity and not be subject to malfunctions resulting in premature release or inability to release. It must be powerful and rapid acting. Versatility is a prime requirement so that it can be used with different types of stores and on different types of aircraft, while the design should nevertheless be as uncomplicated as is compatible with this requirement.

The need for versatility gives rise to a requirement for an actuator of which the operating shaft stroke length can be readily and reliably varied. It is a particular object of this invention to achieve an actuator which fulfills the above requirements and, especially, can advantageously be adapted to give different stroke lengths in a manner that has not been possible with actuators available hitherto.

According to the present invention, there is provided a powered linear actuator comprising a motor-driven screw jack with an output position feedback potentiometer having in series therewith an adjustable resistor, or a replaceable resistor for which can be substituted other resistors of different values, enabling the jack stroke to be changed.

Preferably a range of replaceable resistors is provided each contained in a plug that can be readily plugged in and withdrawn.

Arrangements in accordance with the invention will now be described by way of example and with reference to the accompanying drawings, in which.

Figure 3:
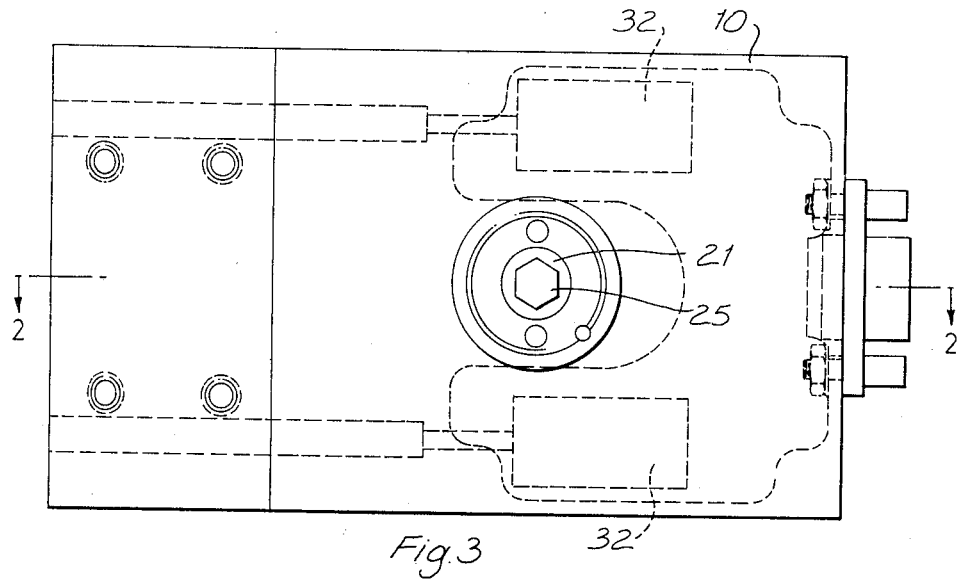
Figure 4:
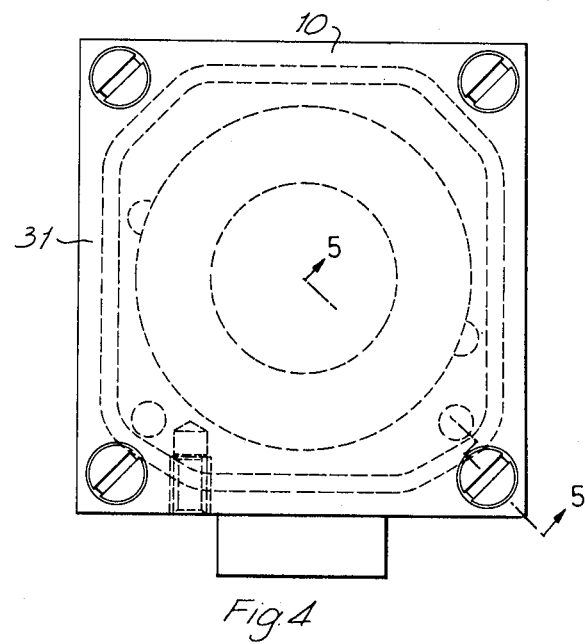
Figure 5:
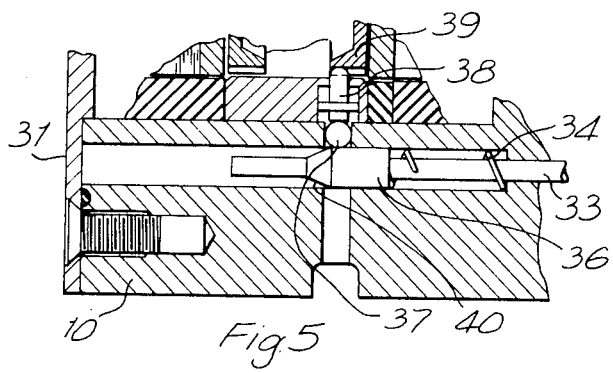
Figure 6:
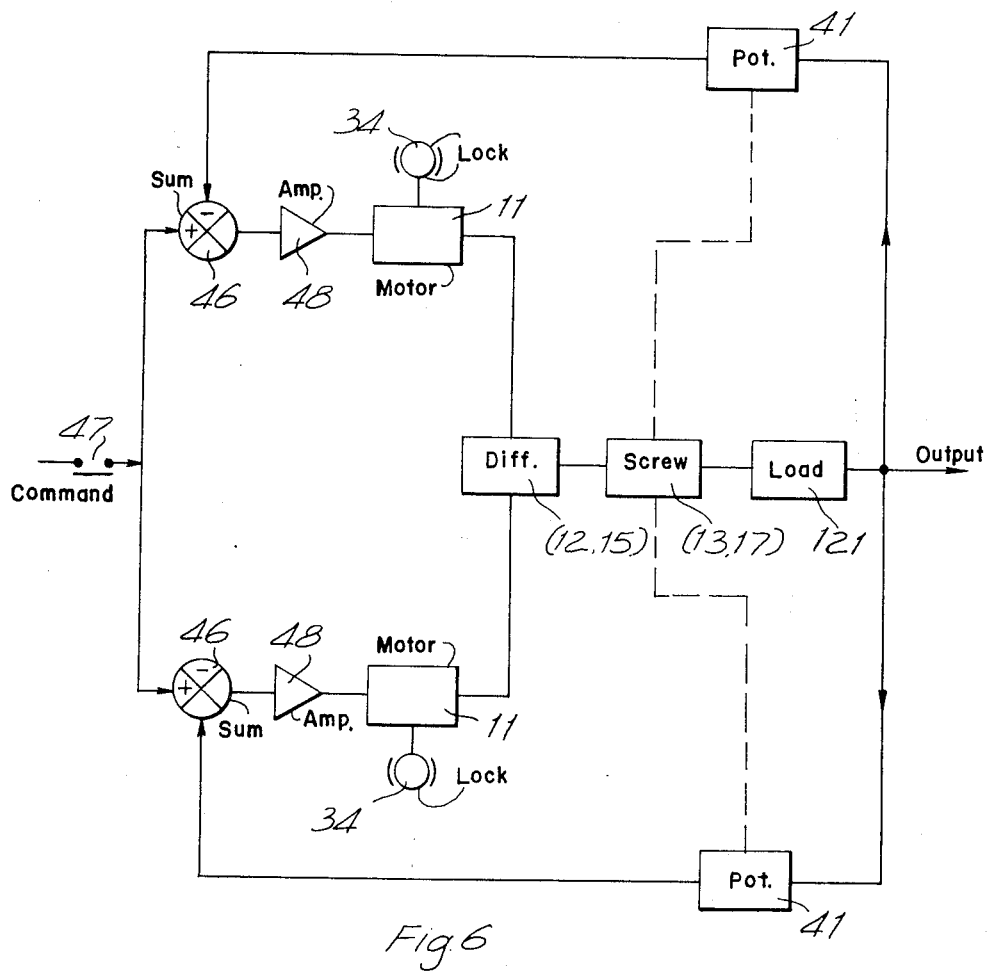
Figure 7:
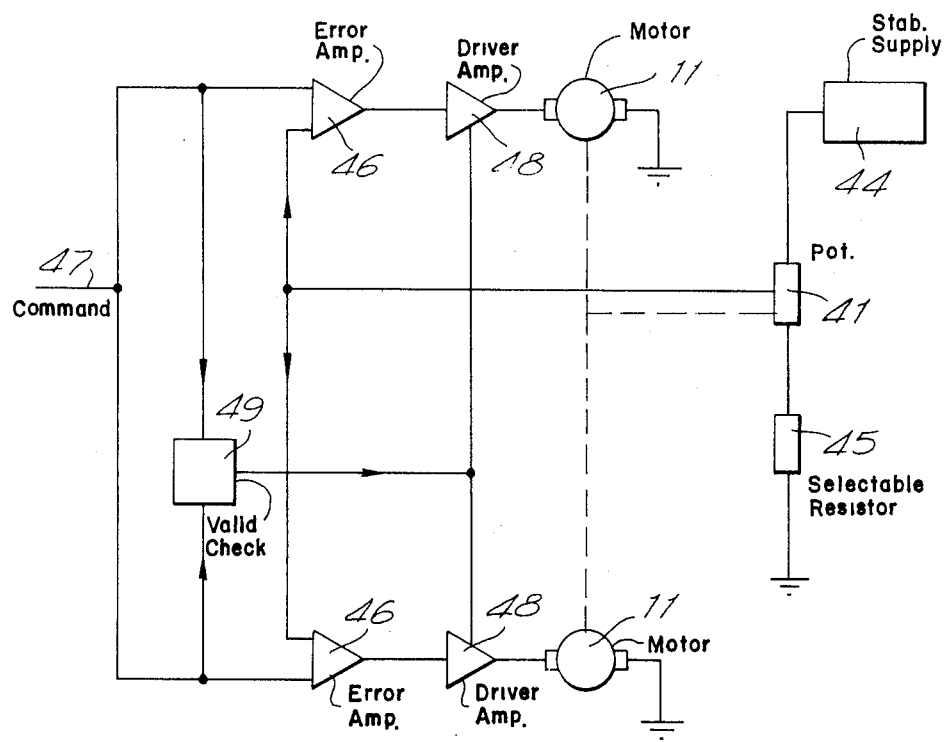
Figure 8:
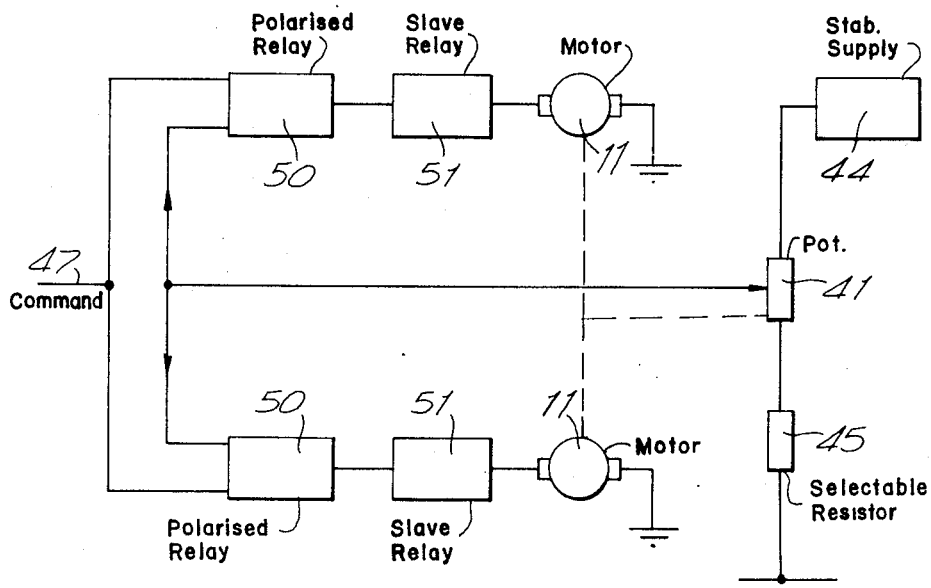
Figure 9:
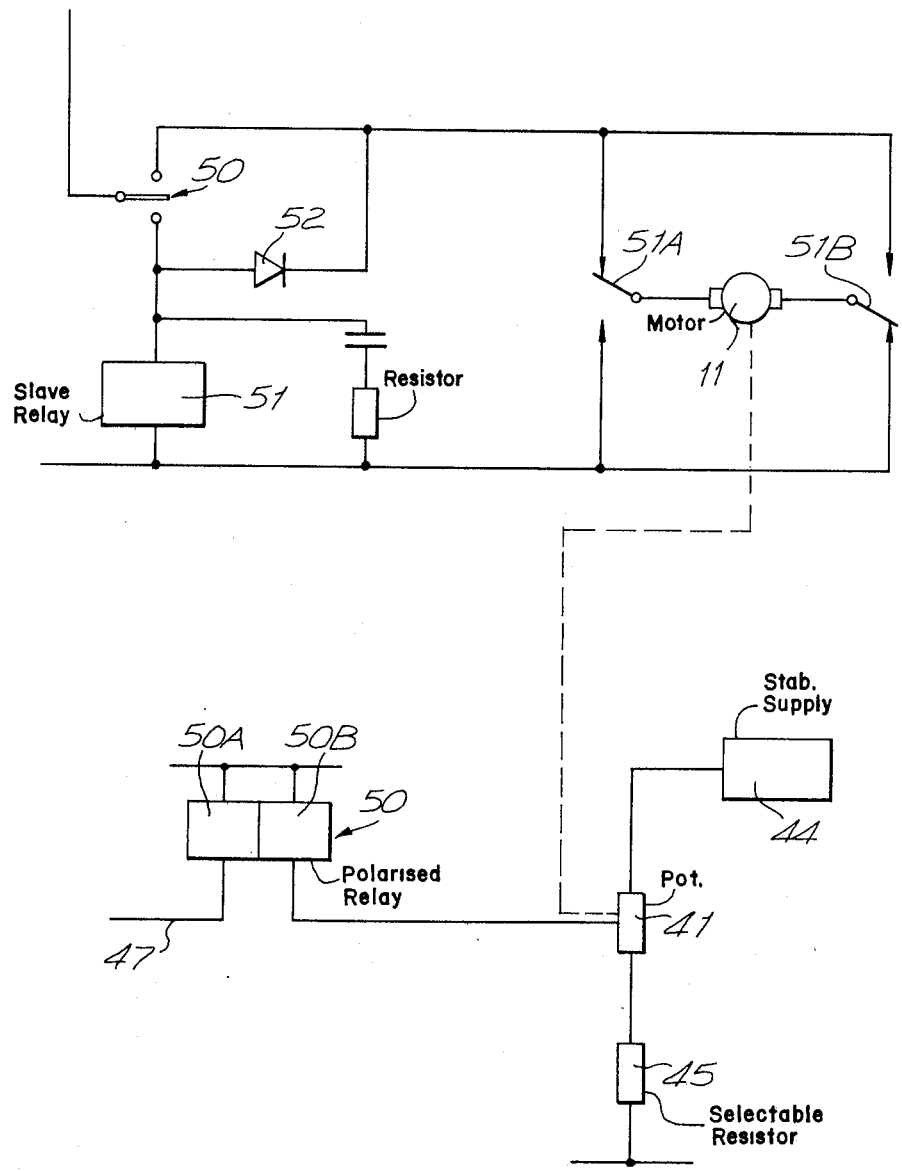

FIGS. 3 and 4 are, respectively, a side elevation and and end view of the actuator, FIG. 5 is a partial view in section on the line 5—5 of FIG. 4, FIG. 6 is a block diagram of the actuator system, FIG. 7 illustrates operation of the actuator system in a closed loop servo mode, FIG. 8 illustrates a modification of the actuator system employing relays, and FIG. 9 shows circuitry of the relay servo system of FIG. 8.

The actuator mechanism can be considered as divided into three basic subsystems:

(a) the primary drive and lock.
(b) the emergency manual drive.
(c) the positional control system.

The motive power consists of two D.C. torque motors 11 (Type QT1207). These motors are of the permanent magnet type, the magnets being made from samarium cobalt (rare earth) material. Each motor is capable of producing a peak torque of 20 oz. ins. and has the torque capability to drive the whole assembly and its load in the event of the other motor failing. The motors are designed to withstand their full stall torque over the range of operating environment specified, and are manufactured by the Inland Motor Division of the Kollmorgen Corporation.

The motors are mutually coupled via a differential assembly which consists of two bevel gears 12 that rotate respectively with the two motor rotor assemblies 14 and mesh with planetary pinions 15 rotating on pins 16 set radially in a screwed sleeve 13. In the event of either of the motors failing to function, the remaining motor will rotate the screwed sleeve 13 at half the speed designated for the fully operational drive.

The sleeve 13 drives a screwed shaft 17 which is prevented from rotating by a square section 18 of the shaft that only permits the shaft to slide through a normally stationary bevel gear 19 of an emergency manual drive 20. Hence the action resulting from rotating the screwed sleeve 13 on the shaft 17 causes the actuator ram spindle 121, forming an extension of the shaft 17, to extend or retract, depending upon the direction of the motor drive.

In the event of both motors 11 being inoperative the actuator ram can be extended or retracted by the use of the manual drive 20. The manual drive is normally locked by a pin 27 locating in a groove in the actuator housing 10.

The manual drive comprises a drive bush 21 bearing a spur gear 22 meshing with a pinion 23 fast with a bevel gear 24 that meshes with the bevel gear 19 through which the screwed shaft 17 slides. The drive is engaged by inserting an Allen key in a hexagonal socket 25 in the manual drive bush 21. Pushing the bush 21 inward against a spring 26 releases the locking pin 27 from its groove, and thus allows the gear train 22, 23, 24, 19 to rotate. This in turn rotates the screwed portion of the ram shaft 17, causing the shaft to screw in to or out of the screwed sleeve 13 and thus providing the facility to manually position the actuator ram.

To permit rotation of the screwed portion of the ram shaft 17 it is divided about half way along its length, just on the outward side of the bevel gear 19, the two halves being joined by a ball-race joint 28 which allows rotation of the inner shaft 17 relatively to the spindle 121 without affecting the sliding motion. The manual drive ratio is four to one. This requires approximately three and three quarter turns of the Allen key to extend or retract the actuator through its full stroke.

The complete actuator assembly is housed in a machined aluminium housing 10 which is divided into two compartments 29, 30, each compartment being accessible through an access cover 31. The rear compartment 29 houses the motors 11, motor locks and the differential gear driving the ram shaft 17.

The lock assembly includes motor lock solenoids 32 housed in compartment 30 and connected in series such that when current flows through the motor armature circuits the solenoids are energised and the locks are removed, leaving the motors free to rotate. This situation persists as long as the circuits remain energised, but circuit failure of a motor results in the respective lock being applied.

Following energisation of the armature circuits, rods 33 (FIG. 5) are retracted against springs 34. This withdraws heads 36 from engagement with balls 37 and allows the balls to be forced outwards by spring-loaded lock plungers 38 thereby disengaging the plungers from toothed members 39 of the motor rotor assemblies.

Circuit failure results in the rods 33 extending under the action of springs 34 which in turn causes cam faces 40 on the heads 36 to force the balls 37 against the plungers 38 and engage the locks.

The lock solenoids are arranged to have only a small inductance compared with that of the motor armatures.

The actuator operates according to a closed loop servo system.

The primary aim of the closed loop servo is to provide a single actuator unit to cover a range of strokes. A change of a replaceable resistor is the only modification necessary to enable a single actuator to accommodate different stroke lengths. The appropriate replaceable resistor is contained within a plug/socket arrangement on the installation.

Figure 1:
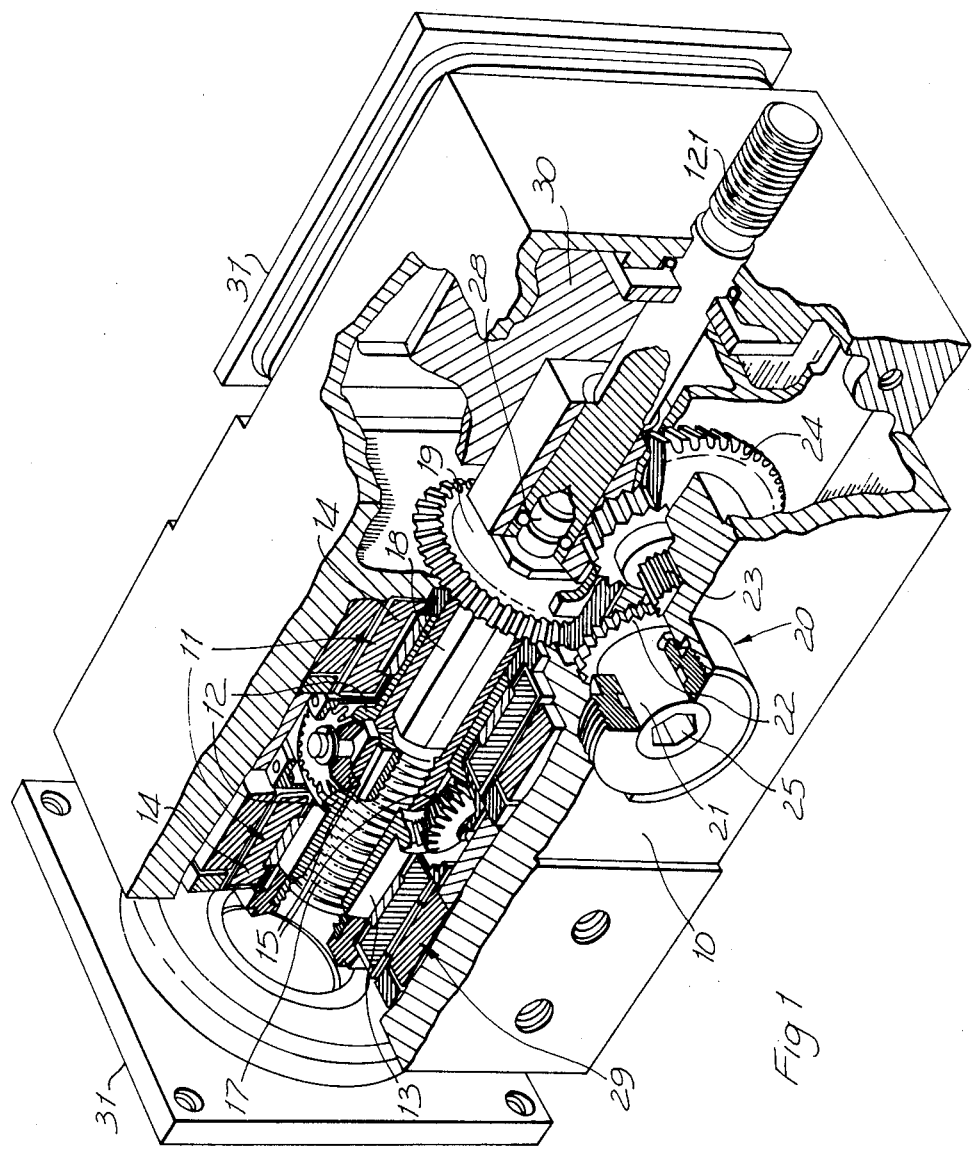
FIG. 1 is a general cut-away pictorial view of an actuator to be described.
Figure 2:
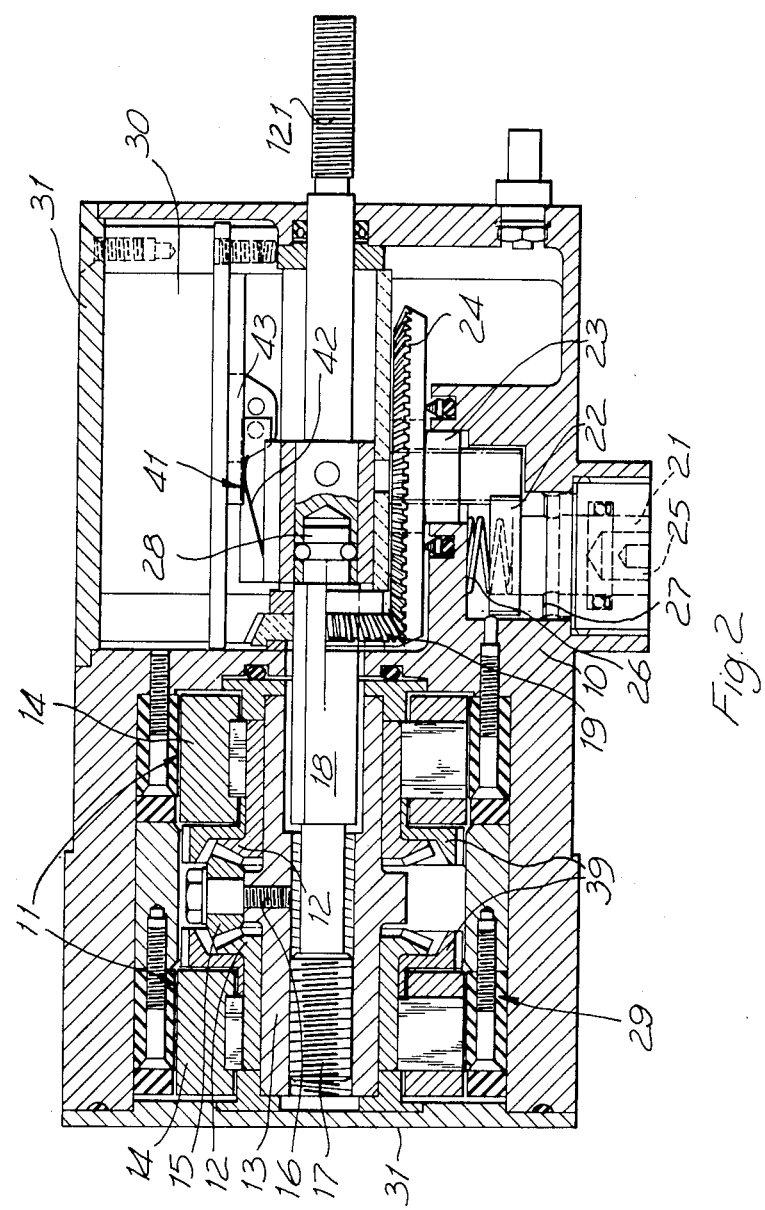
FIG. 2 shows the actuator in plan, in section on the line 2—2 of FIG. 3.

To achieve the closed loop servo system, positional information in respect of the spindle 121 is given by a potentiometer 41 (FIGS. 2 and 6) consisting of a wiper 42 and a track 43 mounted on a printed circuit board. Two similar potentiometers are included, to ensure continued operation in the event of one servo system failing. The potentiometer resistive track 43 is energised by a stabilized supply 44 (FIG. 7) and the replaceable resistor 45 is connected in series with the potentiometer track so that the particular voltage produced for the same ram spindle position is different according to the value of resistor fitted. This will allow for different stroke lengths.

The feedback signal from each potentiometer 41 is compared at 46 with the input command signal applied at 47 to produce a difference or error signal. A power amplifier stage 48 drives the respective motor 11 in the required direction to reduce the error signal towards zero.

The electronics is packaged for containment in the actuator hosuing. In order that the motor can be driven in either direction from the single power supply a transistor bridge circuit may be utilised. According to which pair of transistors is conducting, the polarity of the supply to the motor and hence the direction of rotation can be changed.

To give lower power dissipation in the power amplifier a Class D technique can be used whereby the motor is switched directly across the power supply for a variable time duration. This keeps power dissipation in the motor driver stage to a minimum as the transistors are either turned off or turned hard on. The maximum power dissipation state when the transistors have half the supply voltage across them is only a transitory one and depends on the operating speed of the transistors selected.

If desired, a solid state motor current detector can be incorporated to effectively give the motor lock solenoids greater sensitivity.

Ambiguous command signals (e.g. an open circuit command line to one servo) would result in the motors receiving no extend or retract command. In FIG. 7 there is shown a command validity check unit 49 which compares the command inputs to the two servos and overrides the normal servo operation if ambiguity is detected.

In the relay servo system shown in FIGS. 8 and 9, polarised relays 50 are used to produce the error signal and effect the required control. FIGS. 8 and 9 show the general arrangement of a relay servo system. Each relay 50 is wound with two coils 50A, 50B and the magnitude and direction of currents in the coils can be arranged so that the magnetic flux cancels and leaves the relay contact in its centre or non-contacting position. If the magnitude of the current in one coil is changed then the movable relay contact will engage one or other of the fixed contacts. Thus, the potentiometer feedback signal is compared magnetically in the relays with the command input and the relay contacts will deflect one way or the other to determine the required motor direction. Respective slave relays 51 have contacts 51A, 51B to change the supply polarity to the motors, thus allowing bi-directional motor operation from a single power supply. The diode 52 allows the power supply to be applied to the motor 11 for either state of operation of relay 50 but to relay 51 for only one state.

The relay servo system uses few components and has the advantage that the full power supply voltage can readily be applied to the motor.

The actuator described has numerous advantages. By embodying a replaceable resistor into the interface wiring, the same actuator can be fitted into different installations having different requirememts for length of stroke. Furthermore, if the replaceable resistor is contained in a cartridge or plug that can be quickly plugged into or unplugged from the actuator, changes of stroke length can be made very easily.

The use of rare earth motors allows the actuator to stand the full stall load indefinitely without detriment. The output of a motor will not deteriorate on being stalled due to lack of back EMF. The torque output of the motors is constant for a given applied voltage regardless of speed and hence no stepping of gearing is required. Hence the actuator thrust is constant regardless of speed.

Due to the internal positional sensing potentiometers it is possible to wire the control circuits for a programmable output varying torque/thrust, speed and/or displacement.

The use of rare earth motors also allows operation in more elevated temperatures than hitherto.

The same actuator can have alternative electronic-/electrical control circuits inbuilt to give either closed loop (proportional control) or open loop control.

The actuator can be readily designed to be unaffected by a nuclear environment, using nuclear hardened components in the electronic control circuits.

The manual override allows the actuator to be operated in the event of a power failure or when electrically disconnected.

The actuator is particularly suitable inter alia for operating aircraft safety and release locks on weapon suspension and ejection equipment, and also electrically-operated safety pin or arming devices on airborne, shipborne or ground based armaments.

Other special uses are the operation of access doors and other devices for nuclear environments, e.g., at nuclear power stations, and combination locks for vaults, safes, etc. In addition, there are many other situations requiring linear actuator controlled devices where the invention can be usefully employed.

Modifications of the arrangement described are possible without departing from the scope of the invention. Thus, instead of a relaceable resistor there may be used a variable resistor or potentiometer, adjustable by means of a manual adjustor that is graduated with different stroke values.

What we claim is:

1. A powered linear actuator, comprising
   a screw jack having a non-rotary rectilinearly-moving screwed shaft and a rotary non-rectilinearly-moving screwed sleeve surrounding the shaft in screw engagement therewith;
   an axially aligned pair of electric motors coaxially surrounding the screwed shaft and sleeve;

differential gearing coupling both said motors in driving relationship with said screwed sleeve, and including a pair of gears each individually driven by a respective one of said motors and a set of planetary pinions mounted on the screwed sleeve and meshing with both said gears, whereby said pair of motors share substantially equally in driving said screw jack;

a pair of motor locks, one for each motor, each automatically engaging to lock the respective motor against rotation in the event of motor circuit failure;

output position feedback potentiometer means operatively coupled to said screwed shaft and generating a feedback signal;

driving circuit means responsive to said feedback signal and an input command signal to derive a drive signal for applicaton to the motors; and resistor means in series with said potentiometer means the resistance value of which is selectable at will to determine the length of stroke of the shaft of the screw jack.

2. An actuator according to claim 1, wherein the motor locks are withdrawn against spring action by solenoids connected into the motor driving circuit means so that failure of a motor circuit results in automatic locking of the respective motor armature.

3. An actuator according to claim 1, wherein the motors have rare earth, e.g. samarium cobalt, permanent magnets.

4. An actuator according to claim 1, wherein a manual operating gear is provided for actuating the jack in the event of complete motor failure, said manual operating gear being locked during normal operation of the actuator.

5. An actuator according to claim 4, wherein the screwed shaft of the jack passes slidably through, but cannot rotate relatively to, a gear wheel which is stationary during normal operaton of the actuator but can be rotated by the manual operating gear.

6. An actuator according to claim 5, wherein the screwed shaft of the jack and an output shaft extending out of the actuator are connected end to end by coupling means that enables relative rotation to take place whereby during manual operation the screwed shaft can be rotated without rotation of the output shaft.

7. An actuator according to claim 1, wherein the potentiometer feedback signal is compared with the input command signal separately in two error amplifiers the outputs of which are applied to respective driver amplifiers feeding respective motors.

8. An actuator according to any one of claims 4 to 6 wherein the potentiometer feedback signal is compared with the input command signal magnetically in two polarized relays to produce reversible polarity output signals indicative of the relative magnitudes of said signals, slave relays responsive to said polarized relay output signals for producing reversal of the direction of actuator operation when the result of the comparison in the polarized relays produces a change in polarity of said output signals.

9. A powered linear actuator comprising a motor driven screw jack having a control circuit including an output position feedback potentiometer and an electric resistance in series therewith;

means whereby said electrical resistance in said control circuit may be changed at will to determine the length of stroke of the shaft of said screw jack;

a differential gearing;

a pair of electric motors coupled to drive said jack screw through said differential gearing;

each said electric motor having a permanent magnet rotor and a field winding;

a brake for each of said rotors, and sensing means disposed in series with each said winding for applying said braking means upon loss of current through a winding, to the one of said rotors associated with such winding.

* * * * *